March 31, 1970 J. E. STONE 3,504,350

FLIP-FLOP MEMORY WITH MINIMIZED INTERCONNECTION WIRING

Filed Jan. 11, 1966 2 Sheets-Sheet 1

INVENTOR
JACK EDWARD STONE

BY Sheldon Kapustin

ATTORNEY

FLIP-FLOP MEMORY WITH MINIMIZED INTERCONNECTION WIRING

Filed Jan. 11, 1966 2 Sheets-Sheet 2

United States Patent Office 3,504,350
Patented Mar. 31, 1970

3,504,350

FLIP-FLOP MEMORY WITH MINIMIZED INTERCONNECTION WIRING

Jack Edward Stone, Ambler, Pa., assignor to Sperry Rand Corporation, New York, N.Y., a corporation of Delaware Filed Jan. 11, 1966, Ser. No. 519,936
Int. Cl. G11c *5/06, 11/34*
U.S. Cl. 340—173 7 Claims

ABSTRACT OF THE DISCLOSURE

This invention relates to a word organized memory matrix employing active memory cells. Each of the cells includes a pair of transistors connected in a flip-flop configuration, a pair of transistors that operates as a read-out gate; and a transistor that operates as a read-in gate. The matrix employs a minimum of drive lines to select memory elements and for reading or writing.

This invention relates to an improved active memory cell to be used, in particular, in a high speed, non-destructive, word organized memory matrix. Such memory matrices are commonly employed for the storage of data in a digital computer, particularly where such data must be readily available for computational purposes. The invention contemplates the economical use of only a few elements for each storage cell in the matrix as well as a minimum number of drive and read-out lines for the matrix. In the preferred embodiment of the invention each active memory cell comprises one flip-flop and two gate circuits. The two gate circuits are operated such that power dissipation occurs only when a memory read or write operation takes place; that is when data is being transmitted to a cell or being transmitted therefrom.

The circuit configuration for each memory cell requires that only two external control or information lines be connected to the memory matrix. One external line is used both as a read and write information line; that is, it is used to transmit data in bit form to the memory as well as to transmit data from the memory. The second line is used during either a read or a write operation to select a group of memory cells which are to receive or transmit the one or zero bits comprising a word. Minimizing the number of external lines to the memory matrix not only decreases construction costs but also minimizes the possibility of cross-talk between lines.

In the organization of the memory, in the preferred form, it is contemplated that a selected group of cells will simultaneously either receive or transmit all the one and zero bits comprising a word of information.

The use of active memory cells of the type briefly described above has certain advantages over other types of high speed memory devices, such as thin film or plated wire memories. While plated wire or thin film elements of the type well known in the art operate at substantially the same speed (i.e., in nanoseconds) as the memory cell of the type disclosed herein, they cannot be as advantageously employed. For example, the currents required for storing a one or zero bit are much less in the memory matrix comprising the above disclosed active memory cells than in a film or plated wire memory. Further, the output signal generated when interrogating an active memory cell of the type disclosed is higher than from a thin film or plated wire memory. These advantages as well as others are obtained because of the characteristics of the active memory cell comprising transistor elements are compatible with the transistors forming the logical elements of the computer that transmit and receive data to and from the memory. Still a further advantage of using an active memory cell comprising transistors as contrasted to a thin film or plated wire memory, is that transistor circuitry lends itself to monolithic integrated circuit techniques whereas the thin film or plated wire memories do not.

These and other advantages will become more readily apparent as the following description of the invention is read in conjunction with the accompanying figures in which.

Figure 1:
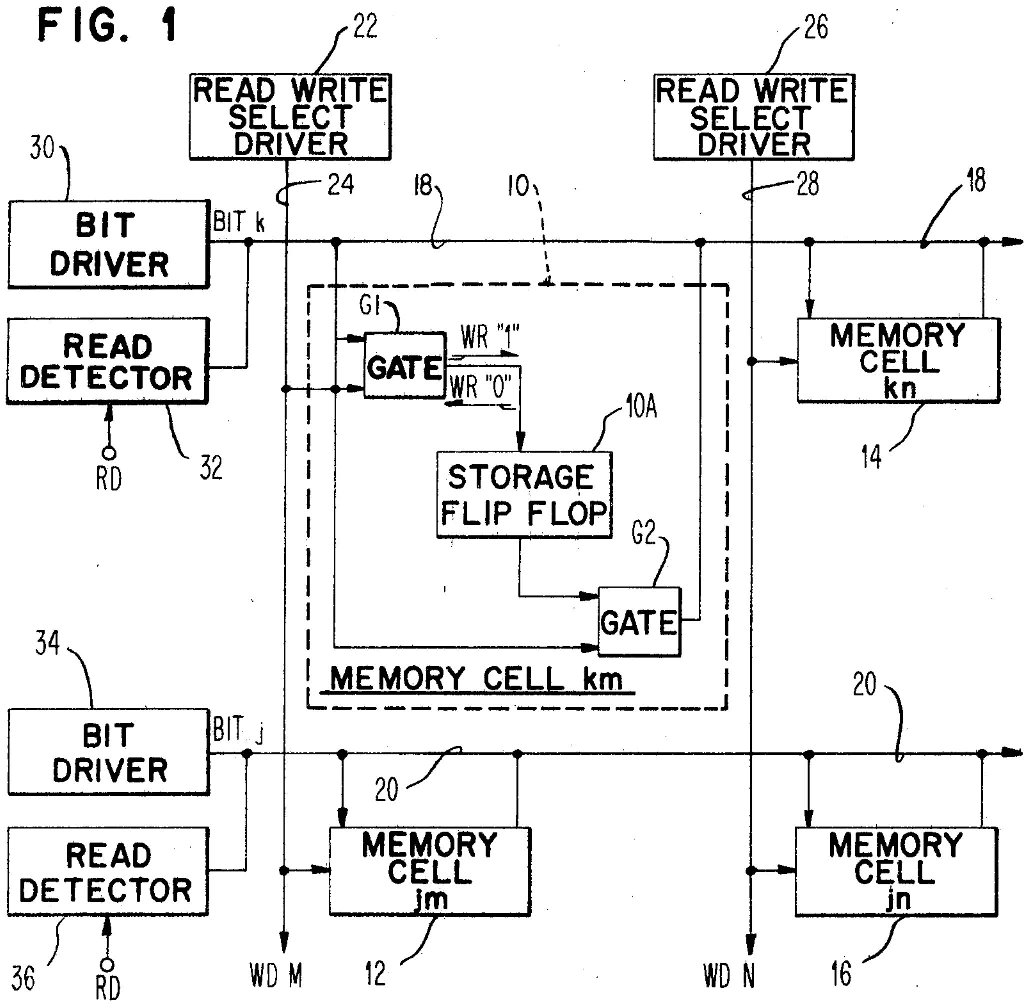
FIGURE 1 shows a block diagram of the preferred form of an active memory cell.

Referring now to FIGURE 1, there is shown a portion of a word organized memory matrix comprising the active memory cells 10, 12 etc. In the embodiment described, it is assumed, by way of example, that each computer word comprises eleven bits (ones or zeros) and all the bits of one word are stored in one vertical column of the matrix. Thus, the eleven bits of word M are stored in memory cells *am* to *km*. Only memory cells *jm* and *km* for word M are illustrated, and those cells are identified with reference numerals 12 and 10 respectively. While the memory matrix is shown as comprising two columns, for words M and N, it will be readily appreciated that the drawing may be extended to show many columns of cells wherein each column stores an eleven bit word. Only the memory cell 10 is shown; the remaining cells 12, 14, and 16 are identical to cell 10.

The memory cell 10 comprises a storage flip-flop 10A, an input gate G1 and an output gate G2. Gate G1 is connected at its output to the input of storage flip-flop 10A and gate G2 is connected at one of its inputs to the output of storage flip-flop 10A. One input of gates G1 and G2 are joined together and connected to read-write line 24. Further, the output of gate G2 is connected to information line 18 as is one input of gate G1.

Information line 18 is connected to similar elements of the K cell 14 etc., in every column of cells in the memory; and the read-write select line 24 (used to select word M) is connected to an input of a gate similar to gate G1 in every memory cell in the column storing word M.

In like manner read-write select lines 28 etc., are connected to the column storing words N etc., and information lines 20 etc., are connected to the cells storing the J through A bits of a word.

Each of read-write select lines 24, 28, etc., is connected to its own read-write select driver, i.e., each line 24, 28 etc., is connected respectively to drivers 22, 26 etc.; and each one of the information lines 18, 20 etc., is connected respectively to its own bit driver 30, 34 etc., and to its own read detector 32, 36 etc.

The read detectors 32, 36 are amplifiers and detect the appearance of information on lines 18 and 20; whereas the bit drivers 32 and 34 are amplifiers which drive their respective information lines and apply ones or zeros to the memory cells.

The read-write select drivers 22, 26, etc., connected to drive lines 24, 28, etc., respectively, are used to select a particular column of memory cells to either accept new information from bit drivers 30, 34 etc., or to supply information to the read detectors 32, 36 etc., over information lines 18, 20, etc., respectively.

Figure 2:
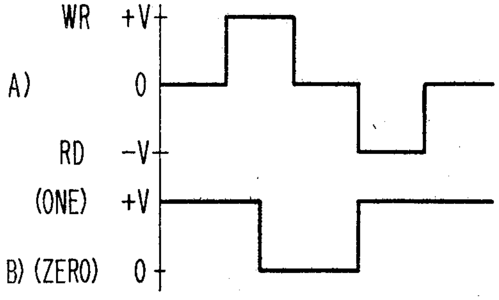
FIGURE 2 shows the voltage wave forms used in conjunction with the memory cell of FIGURE 1.

The wave form of the output for a typical read-write select driver is shown in line A of FIGURE 2. Normally, the output of a read-write select driver is at zero or ground potential. If a column of memory cells associated therewith is to receive new information, the output of the write select driver is raised to plus V volts and information is written into the cells via the information lines 18.

If information is to be read out of a column of cells associated with a particular read-write selected driver, then the output thereof is dropped to minus V volts, and the read operation takes place whereby the information stored therein is transferred via lines 18, 20 etc., to the read detectors.

The wave form of the output of a typical bit driver is shown in line B of FIGURE 2. If a memory cell connected to a bit driver is to receive a zero the potential at the output of the bit driver is dropped to ground. Normally the output of a bit driver is at a positive potential and represents a one.

In operation, gate G1 (FIGURE 1) is non-responsive or inhibited when the read-write line 24 is at ground or at negative potential. Thus, gate G1 is not used during the read operation (see FIG. 2, line A). However, during the write operation, line 24 is raised to plus V volts and gate G1 is rendered permissive to transfer information appearing on line 18 to be stored in flip-flop 10A. As shall be described in connection with FIGURE 3, if a one bit is to be stored in flip-flop 10A, current is transferred through gate G1 in a first direction to set flip-flop 10A to a first state and if a zero bit is to be written current passes through gate G1 in a second direction and the flip-flop 10A is set to its other state.

During the write operation when line 24 is at plus V volts, gate G2 is inhibited. This latter gate is only used during the read operation. When this occurs line 24 is at minus V volts and gate G2 is rendered operative to transfer the output of flip-flop 10A to line 18.

Figures 3, 4:
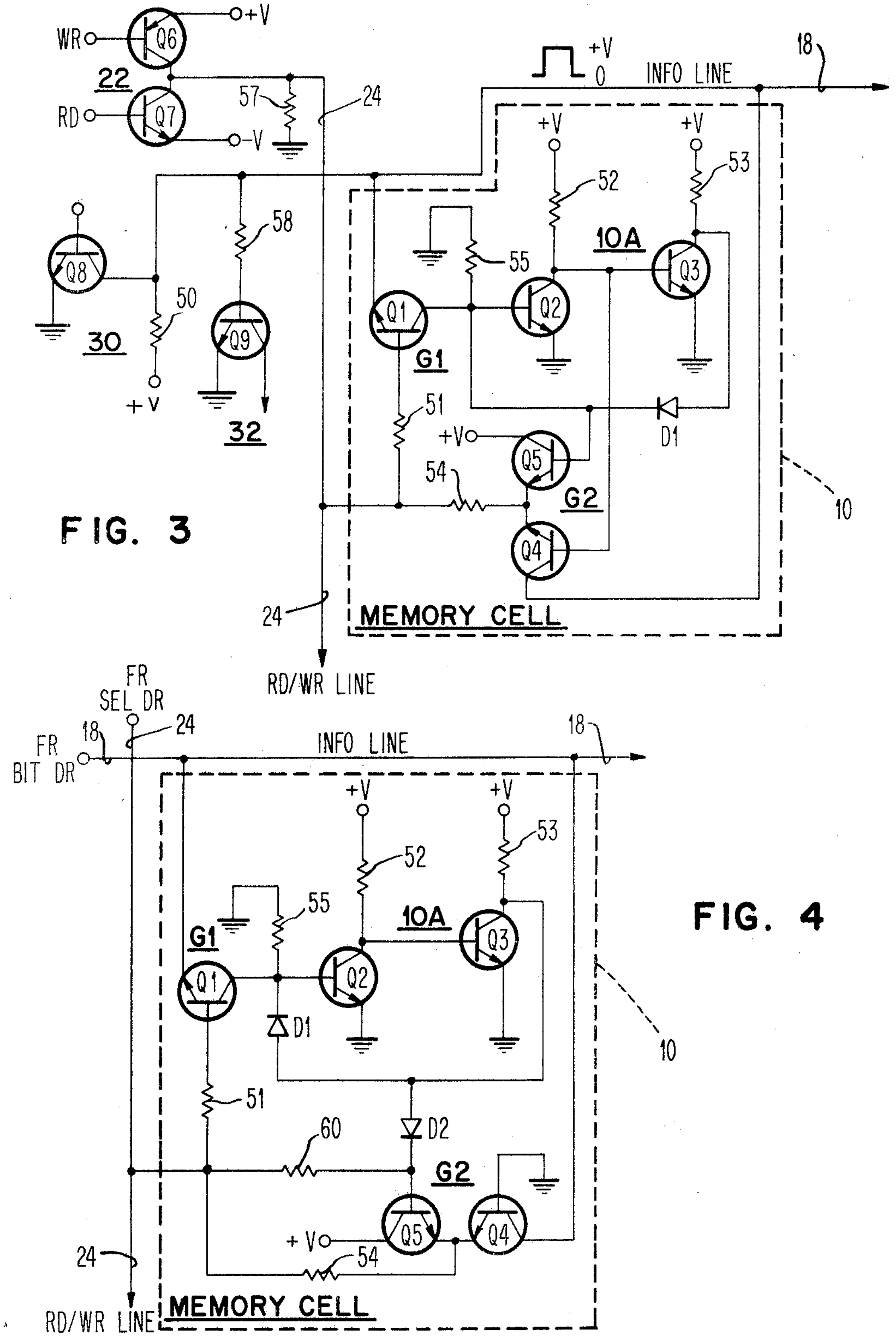
FIGURE 3 shows in schematic form a first embodiment of the inverter cell.
FIGURE 4 shows in schematic form a second embodiment of the inverter cell.

Refer now to FIG. 3 which illustrates in schematic form the memory cell 10 as well as the read-write select driver 22, the bit driver 30 and the read detector 32.

The memory cell comprises five transistors Q1 through Q5, wherein transistor Q1 performs the function of gate G1, transistors Q2 and Q3 are connected to form a flip-flop and transistors Q4 and Q5 form gate G2. In the preferred embodiment these transistors are the NPN type. It is to be understood that PNP transistor may be used as well. However, appropriate voltage polarities must be observed.

The transistors Q2 and Q3 of flip-flop 10A are connected so that the collector of transistor Q2 is connected to the base of transistor Q3, and the collector of transistor Q3 is connected via diode D1 to the base of transistor Q2. The emitters of both transistors Q2 and Q3 are connected to ground and the collectors thereof are coupled via resistors 52 and 53 respectively, to sources of positive voltage plus V. The base of transistor Q2 is connected through a resistor 55 to ground. The input of flip-flop 10A, at the base of transistor Q2, is connected to the collector of transistor Q1 (gate G1). The emitter of transistor Q1 is connected to information line 18 so that information (zero or one bits) may be transferred via transistor Q1 to the flip-flop 10A. The base of transistor Q1 is connected via resistor 51 to the read-write line 24. Thus, element 10 is selected for writing when the base of transistor Q1 is rendered positive by a write pulse appearing on line 24 (see FIG. 2, line A).

Gate G2 comprising transistors Q4 and Q5 is connected so that the base of transistor Q5 receives the output at the collector of transistor Q3 via diode D1 and the base of transistor Q4 receives the output at the collector of transistor Q2 of flip-flop 10A. The collector of transistor Q5 is connected to a source of positive potential and the collector of transistor Q4 is connected to information line 18. The emitters of both transistors Q4 and Q5 are coupled via resistor 54 to read-write line 24. Thus, when line 24 is driven negative, when a read pulse is applied thereto, the transistors forming gate G2 may be rendered conductive.

Connected to the information line 18 are shown normally non-conductive transistor Q8 of bit driver 30 and transistor Q9 of read detector 32. Transistor Q8 has its emitter grounded and its collector connected to information line 18 as well as to a positive source of potential plus V through resistor 50. When transistor Q8 of bit driver 30 is non-conductive, the potential on information line 18 will be positive; when transistor Q8 is rendered conductive by a positive pulse supplied to the base thereof, the potential on line 18 will drop to substantially ground potential. By convention, when a zero is to be written into a memory cell, transistor Q8 will be turned on so that the information line will be at substantially ground potential and when a one is to be written transistor Q8 will remain non-conductive, and the information line will be at a positive potential (see FIG. 2 line B).

Transistor Q9 of read detector 32 has its emitter grounded and its base connected to information line 18 through resistor 58. In the quiescent condition information line 18 is normally positive and base emitter current flows through transistor Q9. The effect of this current in dropping the normally positive potential on line 18 is minimized by adjusting the relationship of resistors 50 and 58 so that resistor 58 is greater than resistor 50. Additionally, it should be noted that the output of the read detector 32 may be gated (by means not shown), so that unless a read operation is taking place the information on line 18 is not transmitted via the read detector. The particular gating circuit connected to the output of the read amplifier 32 is not germain to this invention.

The read-write select driver 22 comprises a pair of transistors Q6 and Q7 which are the write and read drivers respectively. The emitters of transistors Q6 and Q7 are connected to potential source minus V and plus V respectively and the collecttors are connected to read-write line 24. Additionally, the collectors of transistors Q6 and Q7 are connected through resistor 57 to ground potential.

The base of transistor Q7 is normally held at minus V potential and the base of transistor Q6 is held below ground, so that neither transistor is conducting. Accordingly, the quiescent potential of the collectors of both transistors Q6 and Q7 and on line 24 will be at ground potential. A positive write pulse appears on read-write line 24 when transistor Q6 is rendered conductive by the application of a positive signal at the base thereof (see FIG. 2 line A). A negative pulse appears on read-write line 24 when transistor Q7 is rendered conductive by the application of a positive signal at the base thereof.

Before discussing the reading of information from the memory or the writing of information thereinto, it should be noted in the flip-flop 10A comprising transistors Q2 and Q3 that both of these transistors will never be fully conducting simultaneously. The condition of elements Q2 and Q3 determines the data stored in the cell. By convention, it will be assumed that when transistor Q2 is conducting (i.e. turned on) and transistor Q3 is not conducting (i.e. turned off), the cell is storing a binary one; and if the reverse condition obtains, the cell is storing a binary zero.

WRITE OPERATION

When the matrix is not being operated all the select lines 24, 28 etc. are at ground potential, and all the information lines 18, 20 etc. are at a positive potential. Consequently, the transistors Q1 in all of the cells are biased so that they are virtually cut off. In order to select a column of memory cells for writing, the read-write select line associated therewith is raised to the positive write potential (FIG. 2 line A). When this occurs all the transistors Q1 in the selected column are rendered operative and the information on the information lines are transmitted to the appropriate column of the activated storage cells.

Assume, for example, that the output of bit driver 30 is at a potential to indicate the presence of a one bit (see FIG. 2 line B) and that bit driver 34 causes line 20 to drop to ground potential to indicate the presence of a zero bit. Further, assume that it is desired to write into the column storing the word M. Accordingly, write driver transistor Q6 is rendered conductive by a positive pulse applied to the base thereof whereby line 24 is raised to the positive write potential (FIG. 2 line A).

Referring in particular to cell 10 on FIG. 3 it will be further assumed that the cell is storing a zero, i.e. transistor Q3 is conducting and transistor Q2 is not conducting. It will be readily appreciated under these circumstances that the collector of transistor Q1 will be at substantially ground potential just prior to the time that the write operation takes place when a zero is stored in cell 10. When a one bit is to be written into cell 10 the potential at the base and emitter of transistor Q1 is raised. Under these circumstances since Q1 is an NPN transistor normal transistor action will not take place. However, current will flow from the read-write line 24 through resistor 51, the base collector junction of transistor Q1 through the resistor 55 to ground whereby the potential at the base of transistor Q2 in flip-flop 10A is raised. In response to the positive potential applied at the base of transistor Q2 the flip-flop 10A will store a one bit. This occurs as follows; transistor Q2 is rendered conductive whereby the potential at the collector thereof drops from a positive potential to substantially ground potential. This drop in potential is applied to the base of transistor Q3 so as to virtually cut off current flow through this transistor. With transistor Q3 non-conductive current now flows from source plus V through resistor 53, diode D1 and resistor 55 to ground. This latter current flow keeps the potential at the base of transistor Q2 positive so that the one state of flip-flop 10A is maintained.

If storage cell 10 is already storing a 1 bit, obviously its condition will not be changed by the application of a positive one signal on information line 18.

It will be recalled that the bit on information line 20 was a zero. To appreciate how the zero bit is stored in cell 12, reference again should be made to FIG. 3 which illustrates in schematic form a cell identical to cell 12. When writing a zero into cell 12, line 20 will drop to substantially ground potential. This occurs when the bit driver associated with line 20 is turned on. The bit driver for line 20 is similar to element 30 of FIG. 3 and hence when the transistor similar to Q8 therein is rendered conductive, information line 20 will drop to substantially ground potential.

Assuming that cell 12 is presently storing a one bit then transistor Q2 is conducting and transistor Q3 is not. The base of transistor Q1 cell 12 is, of course, similarly connected through a resistor to read-write select line 24 which is now at the positive write potential (see FIG. 2 line A). Since cell 12 is storing a one bit and transistor Q3 is off, the collector of transistor Q1 which is connected via diode D1 to the collector of transistor Q3 will be at a positive potential. Accordingly when a zero bit is to be written into cell 12 the transistor Q1 is turned on and acts like a conventional transistor. When this occurs the collector of transistor Q1 drops to substantially ground potential. Since the base of transistor Q2 is connected to the collector of transistor Q1 transistor Q2 will be rendered non-conductive, and its collector voltage will rise to apply a positive potential at the base of transistor Q3. When the potential at the base of transistor Q3 raises this transistor will be turned on and current no longer will be supplied via diode D1 to resistor 55 connected to the base of transistor Q2. The base of transistor Q2 therefore will remain at substantially ground potential and the flip-flop 10A will be stabilized in its zero condition.

It will be readily appreciated that if cell 12 already contains the zero bit that the cell will be unaffected by the zero information on line 20.

Before discussing the read operation it should be noted again that line 24 is connected via resistor 54 to the emitters of transistors Q4 and Q5 which comprise gate G2. It will be readily appreciated that since these transistors are of the NPN type that during their write operation when line 24 is positive that these transistors will be non-conductive.

READ OPERATION

The read operation is performed by turning transistors Q1 off in each cell of the word to be read and by turning the transistors Q4 or Q5 of read gate G2 on. This occurs when the voltage on read-write line 24 is driven negative. This negative potential biases input transistor Q1 off and allows transistors Q4 or Q5 of gate G2 to be rendered conductive. The voltage on read-write line 24 drops to a negative potential for reading (see FIG. 2 line A) when transistor Q7 receives a positive signal at its base. Upon receiving a positive signal at its base transistor Q7 is rendered conductive and appears as a low impedance so that line 24 connected to the collector of this transistor drops to substantially the —V potential connected to the emitter thereof.

When it is desired to read the word M, transistor Q7 of the read-write select driver 22 is energized to produce a negative voltage on line 24. If it is assumed that flip-flop 10A in cell 10, for example, is storing a zero, then transistor Q2 will not be conducting and transistor Q3 will. Accordingly, the collector of transistor Q3 and the base of transistor of Q2 are at substantially ground potential whereas the collector of transistor Q2 is at a positive potential equal in magnitude to the voltage drop across the base emitter junction of transistor Q3. With the read signal applied to the emitter of transistor Q4 from line 24 via resistor 54 and the positive signal applied to the base of transistor Q4 from the collector of transistor Q2 the transistor Q4 is rendered conductive and current passes from source +V through resistor 50 via the information line 18 through the transistor Q4 via resistor 54 to read-write line 24 through transistor Q7 to the negative source —V. The emitter of transistor Q4 will be substantially at ground potential, thus insuring that transistor Q5 is rendered non-conducting. Resistor 54 is so chosen that the current passing through it is sufficient to cause the information line 18 to drop to ground potential when a zero bit is read out of memory cell 10. As explained above when a zero bit is stored in flip-flop 10A of memory cell 10 transistor Q4 is rendered conductive and the collector of this transistor which is connected to line 18 will drop to substantially ground potential i.e. the potential at its emitter. Thus the zero bit stored in memory cell 10 is transmitted to information line 18 and this information is applied via resistor 58 to the base of transistor Q9 of read detector 32.

If it is assumed that the flip-flop 10A in cell 10 is storing a one bit then transistor Q2 will be conducting and transistor Q3 will not. Accordingly, substantially ground potential will be applied to the base of transistor Q4 from the collector of transistor Q2 and a positive voltage will be applied to the base of transistor Q5. This positive voltage will be substantially equal to the base emitter drop developed across transistor Q2, and will be enough to turn transistor Q5 on. Furthermore, the voltage at the emitter of transistor Q5 will be substantially at ground potential, thus insuring that transistor Q4 is rendered non-conducting. Now, instead of current passing through transistor Q4 to resistor 54 and thence to transistor Q7, current will now flow from positive source, plus V through transistor Q5 resistor 54 and transistor Q7 to source —V. Therefore, the potential on line 18 will remain at a positive level representing the one bit. This information is applied via resistor 58 to the read detector 32.

Transistor Q5 and the current path it provides are used to insure that current from the read driver (transistor Q7) will not pass through transistor Q4 and affect the voltage on the information line 18.

Refer now to FIG. 4. In the main, the circuit configuration shown in FIG. 3 and FIG. 4 are identical and where this is the case, the figures show the same reference characters. The only change in FIG. 4 is with respect to gate G2. In FIG. 4 the base of transistor Q4 is grounded, instead of being connected to the collector of transistor Q2. Further diode D2 couples the collector of transistor Q3 to the base of transistor Q5 instead of diode D1 and the base of transistor Q5 is connected via resistor 60 to the read-write line 24. The purpose of the modification is to overcome the remote possibility of changing the state of a cell which is not being written in when an adjacent cell is being written into with a zero bit. Thus, referring to FIG. 3, if the information line is at ground, and Q2 is off in a particular memory cell (which is not being written into), there is possible current flow through the collector-base diode of Q4. In addition, there could be a negative noise spike superimposed on the information line, and the above mentioned current could conceivably change the state of the flip-flop unless suitable design precautions are taken. An alternate circuit, which solves this problem is shown in FIG. 4. The operation is essentially the same as the circuit of FIG. 3. It will be observed however, that the information line in FIG. 4 is isolated from the flip-flop 10A by transistor Q4.

It will be appreciated that the write operation using the circuit of FIG. 4 will be the same as previously discussed in connection with FIG. 3.

The read operation will be slightly different. When transistor Q3 is not conducting (i.e. a one bit is stored) current will be transmitted from source +V through resistor 53, diode D2, resistor 60 via line 24 to the read driver transistor Q7. The voltage at the cathode of diode D2 and at the base of transistor Q5 will be of a positive value sufficient to turn transistor Q5 on. When transistor Q5 is turned on the emitter thereof will be at approximately ground potential, as will the emitter of transistor Q4. Since the base of transistor Q4 is also at ground potential during a read operation when a one bit is stored this transistor will not conduct. Accordingly the potential at line 18 will remain high indicative of a one bit.

When transistor Q3 is conducting, (i.e. a zero bit is stored) the collector of transistor Q3 will be substantially at ground potential. The current through resistor 60 and diode D2 will insure sufficient voltage drop across diode D2 to produce a negative potential at the base of transistor Q5. Furthermore, the emitter of transistor Q4, which is rendered conductive will be substantially at the same negative potential as the base of transistor Q5, thus insuring that transistor Q5 is rendered non-conducting. Therefore, current flows from information line 18 via transistor Q4, resistor 54, line 24 to the read transistor Q7. Accordingly, the potential at information line 18 drops and a zero bit is represented on this information line as depicted in FIG. 2 line B.

The embodiments of the invention in which an exclusive property or privilege is claimed are defined as follows:

1. A matrix memory comprising a plurality of cells for storing binary information, each cell comprising a bi-stable storage element having an input and an output, an input gate having an input and an output coupled at its output to the input of said bi-stable storage element and an output gate having an input and an output coupled at its input to the output of said bi-stable storage element, read-write select means having an output terminal for producing read or write signals at said terminal, said output terminal being coupled to the inputs of said input and output gates of at least one cell for selectively rendering a cell operative to receive or transmit information in response to a write or read signal and a common information bus coupled to the input of an input gate and the output of an output gate in at least one of said cells for receiving binary information from said matrix memory and supplying information thereto.

2. The matrix memory defined in claim 1 wherein said bi-stable storage element comprises first and second interconnected transistors, said input gate comprises a third transistor coupling the input of the bi-stable storage element to said information bus and wherein said third transistor is rendered conductive by said read-write select means when said cell is to receive information and is rendered non-conductive when said cell is to transmit information.

3. The memory matrix defined in claim 2 further including an information generating means coupled to said bus for producing a plurality of different information representations, and said third transistor is responsive to a first information representation to pass current in a first direction to said bi-stable storage element and said third transistor is responsive to a second information representation to pass current from said bi-stable storage element.

4. The matrix defined in claim 3 further including an information responsive means coupled to said bus and wherein said output gate comprises a fourth transistor for transferring the information stored in said bi-stable storage element to said bus, said fourth transistor being rendered conductive by said read-write select means when said cell is to transmit information and is rendered non-conductive when said cell is to receive information.

5. The matrix defined in claim 4 further including voltage source means, wherein said output gate comprises a fifth transistor having three electrodes connected at a first electrode to receive the output of said second transistor in said bi-stable storage element, said fourth transistor comprises three electrodes and is connected to receive at a first electrode the output of said first transistor in said bi-stable storage element, like second electrodes of said fourth and fifth transistors being coupled together and controlled by said read-write select means, the third electrode of said fourth transistor being connected to said information bus, the third electrode of said fifth transistor being coupled to said voltage source means, whereby current flows through said fourth transistor from said information bus when information is to be transmitted from a cell and said bi-stable storage element therein is in a first state and current flows through said fifth transistor from said voltage source means when information is to be transmitted from a cell and said bi-stable storage element therein is in a second state.

6. The matrix defined in claim 4 further including voltage source means, wherein said output gate comprises a fifth transistor having three electrodes connected at a first electrode to receive the output of said second transistor in said bi-stable storage element, said fourth transistor comprises three electrodes and is connected at a first electrode to said voltage source means, like second electrodes of said fourth and fifth transistors being coupled together and controlled by said read-write select means, the third electrode of said fourth transistor being connected to said information bus, the third electrode of said fifth transistor being coupled to said voltage source means, whereby current flows through said fourth transistor from said information bus when information is to be transmitted from a cell and said bi-stable storage element is in a first state and current flows through said fifth transistor from said voltage source means when information is to be transmitted from a cell and said bi-stable storage element therein is in a second state.

7. The matrix defined in claim 1 wherein said read-write select means comprises apparatus for selectively rendering one of the gates in a cell operative while rendering the other of the gates in the cell inoperative.

References Cited

UNITED STATES PATENTS 3,354,440 11/1967 Farber ............. 340—173

3,363,115 1/1968 Stephenson ......... 340—173

TERRELL W. FEARS, Primary Examiner

U.S. Cl. X.R.

307—238

UNITED STATES PATENT OFFICE

CERTIFICATE OF CORRECTION

Patent No. 3,504,350 March 31, 1970

Jack Edward Stone

It is certified that error appears in the above identified patent and that said Letters Patent are hereby corrected as shown below:

Column 8, line 71, after "element" insert -- therein --.

Signed and sealed this 15th day of December 1970.

(SEAL)
Attest:

Edward M. Fletcher, Jr.
Attesting Officer

WILLIAM E. SCHUYLER, JR.
Commissioner of Patents